UNITED STATES PATENT OFFICE.

RICHARD HERZ AND ERICH SAUL, OF FRANKFORT-ON-THE-MAIN, GERMANY, ASSIGNORS TO CASSELLA COLOR COMPANY, OF NEW YORK, N. Y.

BLUE SULFID COLORS AND PROCESS OF MAKING SAME.

960,919.  Specification of Letters Patent.  Patented June 7, 1910.

No Drawing.  Application filed July 27, 1909.  Serial No. 509,902.

*To all whom it may concern:*

Be it known that we, RICHARD HERZ, doctor of philosophy, a subject of the Kingdom of Prussia, and a resident of Frankfort-on-the-Main, in the Province of Hessen-Nassau and Kingdom of Prussia, Germany, and ERICH SAUL, doctor of philosophy, a subject of the Duchy of Braunschweig, Germany, and a resident of Frankfort-on-the-Main, in the Province of Hessen-Nassau and Kingdom of Prussia, Germany, have invented some new and useful Improvements in the Production of Blue Sulfid Colors and Processes of Making Same, of which the following is a full description.

We have found that by treating with halogens the sulfid colors derived from indophenols or leukoindophenols, halogen atoms are introduced into the molecule, a simultaneous oxidation taking place in many instances. The new dyestuffs thus obtained are distinguished by a specially good fastness to washing and light, and in many instances to bleaching with chlorin, and also by a specially bright shade. The sulfid colors derived from p-amino-p-oxydiphenylamin, its homologues and derivatives, both those substituted in the nucleus as well as those substituted in the amino-group, are particularly suitable.

The process is illustrated by the following examples:

Example I: 20 kilos of the blue sulfid color obtained from p-dimethylamino-p-oxydiphenylamin are introduced into 200 kilos of concentrated formic acid. The solution is cooled and chlorin is then gradually introduced and passed through, until the weight is increased by 10 kilos. The formic acid is then distilled off, and the residue is washed first with water and next with dilute soda solution, and is then dried. It dyes cotton from a sodium sulfid bath redder and brighter shades than the original dyestuff; the fastness to light and washing and particularly the fastness to chlorin, are considerably enhanced.

Example II: 100 kilos of the sulfid color obtained from p-aminotolyl-p-oxyphenylamin

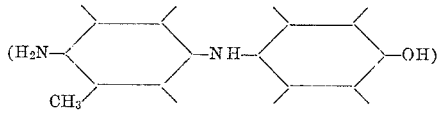

are stirred together with 500 kilos of tetrachlorid of carbon, and a solution of 100 grams iodin in 1 kilo tetrachlorid of carbon is then added. 50 kilos of bromin are gradually run into the solution at 50° C. during a period of about six hours, the solution being well cooled meanwhile as the reaction is very brisk. On the completion of this operation the hydrobromic acid is neutralized with a soda solution, the tetrachlorid of carbon is removed by distillation, and the coloring matter is filtered off and dried. It dyes a blue violet color of exceptional fastness to washing, light and acids.

In place of the solvents mentioned in the above examples, others such as alcohol, glacial acetic acid, nitrobenzene, etc., may be used. In many instances it is feasible to introduce the halogens in aqueous solutions, but in this case the oxidizing action which as a rule takes place simultaneously, is very powerful, and it is therefore necessary to work at very low temperatures.

Having now particularly described and ascertained the nature of our said invention, and in what manner the same is to be performed, we declare that what we claim, is—

1. The manufacture of dyestuffs, by treating with a halogen the sulfid colors derived from indophenols or leukoindophenols, substantially as described.

2. The manufacture of dyestuffs by treating with a halogen the sulfid colors derived from p-amino-p-oxydiphenylamin, its homologues and derivatives, both those substituted in the nucleus as well as those substituted in the amino-group, substantially as described.

3. As new articles of manufacure the dyestuffs obtained by treating with a halogen the sulfid colors derived from p-amino-p-oxydiphenylamin, its homologues and derivatives, both those substituted in the nucleus, as well as those substituted in the amino-group; being in a dry state dark blue powders, insoluble in water and alcohol, difficultly soluble in hot phenol with a reddish blue to bright blue color, easily soluble in an alkaline sulfid solution and dyeing cotton from such a solution violet blue to blue shades fast to washing, acids, and light, substantially as described.

In witness whereof we have hereunto signed our names this 15, day of July 1909, in the presence of two subscribing witnesses.

RICHARD HERZ.
ERICH SAUL.

Witnesses:
   JEAN GRUND,
   CARL GRUND.